United States Patent [19]

Miller et al.

[11] Patent Number: 5,486,228
[45] Date of Patent: Jan. 23, 1996

[54] WASHABLE COLOR CHANGING COMPOSITIONS

[75] Inventors: Richard E. Miller, Nazareth, Pa.; Charlene R. Couch, Richmond, Va.; Cheryl D.. Krieger, Bangor, Pa.

[73] Assignee: Binney & Smith Inc., Easton, Pa.

[21] Appl. No.: 270,485

[22] Filed: Jul. 5, 1994

Related U.S. Application Data

[63] Continuation-in-part of Ser. No. 89,503, Jul. 16, 1993, Pat. No. 5,326,388, and Ser. No. 78,722, Jun. 16, 1993, Pat. No. 5,352,282, which is a continuation of Ser. No. 923,308, Jul. 31, 1992, Pat. No. 5,232,494, said Ser. No. 89,503 is a continuation-in-part of Ser. No. 923,308.

[51] Int. Cl.$^6$ ............................................. C09D 11/02
[52] U.S. Cl. ................... 106/22 B; 106/23 B; 106/21 A
[58] Field of Search ........................... 106/21 R, 21 A, 106/23 B, 22 B

[56] References Cited

U.S. PATENT DOCUMENTS

| | | | |
|---|---|---|---|
| 2,086,745 | 8/1935 | Sell | 106/22 B |
| 2,305,098 | 7/1940 | Minnear | 106/23 B |
| 2,555,474 | 7/1948 | deVries | 106/26 H |
| 2,559,608 | 11/1948 | Ehrlich | 106/22 A |
| 2,589,306 | 12/1948 | Steiner | 106/22 A |
| 3,400,003 | 8/1966 | Guertin | 106/22 R |
| 3,617,325 | 6/1969 | Spokes et al. | 427/145 |
| 3,627,546 | 12/1971 | Coppeta | 106/21 A |
| 3,672,842 | 6/1972 | Florin | 106/21 A |
| 3,700,603 | 6/1972 | Rembaum | 106/21 A |
| 3,705,045 | 12/1972 | Nadolski | 106/22 D |
| 3,870,435 | 3/1975 | Watanabe et al. | 427/145 |
| 3,873,185 | 3/1975 | Rogers | 430/4 |
| 3,876,496 | 4/1975 | Lozano | 106/21 A |
| 3,886,083 | 5/1975 | Laxer | 106/21 A |
| 3,941,488 | 3/1976 | Maxwell | 401/17 |
| 3,945,836 | 3/1976 | Miyata | 106/22 R |
| 3,945,837 | 3/1976 | Miyata et al. | 106/22 D |
| 3,966,400 | 6/1976 | Birke et al. | 8/82 |
| 3,982,251 | 9/1976 | Hochberg | 106/21 A |
| 3,990,839 | 11/1976 | von der Eltz et al. | 8/14 |
| 4,028,118 | 6/1977 | Nakasuji et al. | 106/21 E |
| 4,070,194 | 1/1978 | Arakawa | 106/21 R |
| 4,071,645 | 1/1978 | Kahn | 106/6 |
| 4,139,965 | 2/1979 | Curry et al. | 427/333 |
| 4,162,164 | 7/1979 | Lin | 106/21 R |
| 4,171,982 | 10/1979 | Lin | 106/21 A |
| 4,176,361 | 11/1979 | Kawada et al. | 106/20 R |
| 4,193,906 | 3/1980 | Hatanaka | 106/23 B |
| 4,212,676 | 7/1980 | Ueda | 106/19 B |
| 4,213,717 | 7/1980 | Lin | 106/22 B |
| 4,227,930 | 10/1980 | Lin | 106/22 B |
| 4,246,033 | 1/1981 | von Wartburg | 106/23 B |
| 4,252,845 | 2/1981 | Griffiths et al. | 106/21 A |
| 4,256,494 | 3/1981 | Yamamoto et al. | 106/22 A |
| 4,322,466 | 3/1982 | Tomlinson | 106/21 R |
| 4,352,691 | 10/1982 | Owatari et al. | 106/22 R |
| 4,413,266 | 11/1983 | Aviram et al. | 106/22 B |
| 4,428,994 | 1/1984 | Rawlins | 427/260 |
| 4,460,727 | 7/1984 | Shoji | 106/23 R |
| 4,490,177 | 12/1984 | Shioi et al. | 106/22 R |
| 4,505,749 | 3/1985 | Kanekiyo et al. | 106/22 R |
| 4,525,215 | 6/1985 | Shioi et al. | 106/22 R |
| 4,525,216 | 6/1985 | Nakanishi | 106/23 B |
| 4,557,618 | 12/1985 | Iwata et al. | 106/20 R |
| 4,578,117 | 3/1986 | Nakanishi | 106/20 A |
| 4,604,139 | 8/1986 | Shioi et al. | 106/23 C |
| 4,620,941 | 11/1986 | Yoshikawa et al. | 252/408.1 |
| 4,681,471 | 7/1987 | Hayduchok et al. | 106/22 B |
| 4,708,817 | 11/1987 | Dudnick | 106/22 B |
| 4,725,316 | 2/1988 | Mahany, II | 106/499 |
| 4,732,614 | 3/1988 | Brooks et al. | 106/23 B |
| 4,744,826 | 5/1988 | Iijima | 106/20 A |
| 4,889,559 | 12/1989 | Goldberg et al. | 106/21 C |
| 4,907,903 | 3/1990 | Kawashima | 106/21 R |
| 4,942,185 | 7/1990 | Inoue et al. | 521/54 |

(List continued on next page.)

FOREIGN PATENT DOCUMENTS

| | | |
|---|---|---|
| 282178 | 2/1988 | European Pat. Off. . |
| 289141 | 3/1988 | European Pat. Off. . |
| 352796 | 7/1989 | European Pat. Off. . |
| 2241653 | 3/1975 | France . |
| 2487372 | 3/1981 | France . |
| 551775 | 6/1932 | Germany . |
| 2724820 | 6/1977 | Germany . |
| 2834459 | 8/1978 | Germany . |
| 2927006 | 7/1979 | Germany . |
| 2927005 | 7/1979 | Germany . |
| 3207217 | 2/1982 | Germany . |
| 59-86672 | 5/1984 | Japan . |
| 59-179572 | 10/1984 | Japan . |
| 62-28834 | 7/1987 | Japan . |
| 1-103676 | 4/1989 | Japan . |
| 3-243673 | 10/1991 | Japan . |
| 1455678 | 1/1975 | United Kingdom . |
| 94/06872 | 9/1992 | WIPO . |

OTHER PUBLICATIONS

Photocopy of the Packaging Material, Binney & Smith, Inc., Easton, Pa., (1992).

"Color Fibre Pen Inks", BASF Brochure, (1979).

*Primary Examiner*—Helene Klemanski
*Attorney, Agent, or Firm*—Leydig, Voit & Mayer, Ltd.

[57] ABSTRACT

A washable multiple coloring composition system is disclosed whose coloring effect is changed upon treatment with a second coloring composition, once the second coloring composition has been deposited over the undercolor coloring composition. The washable multiple ink system comprises:

(a) an undercolor aqueous coloring composition comprising a compatable surfactant in an amount sufficient to provide washability and an undercolor dye whose coloring ability is destroyed in the presence of a pH of about 10 or greater and/or by a reducing agent; and (b) an overcolor aqueous coloring composition comprising a compatable surfactant in an amount sufficient to provide washability, a colorant capable of maintaining its characteristic color in the presence of a pH of about 10 or greater and/or a reducing agent, a base in an amount sufficient to yield a pH of the overcolor composition of about 10 or greater, and/or a reducing agent.

52 Claims, No Drawings

U.S. PATENT DOCUMENTS

| | | | |
|---|---|---|---|
| 4,954,174 | 9/1990 | Imagawa | 106/27 R |
| 4,954,544 | 9/1990 | Chandaria | 524/11 |
| 4,988,123 | 1/1991 | Lin et al. | 106/23 R |
| 5,004,763 | 4/1991 | Imagawa | 523/161 |
| 5,006,171 | 4/1991 | Mecke et al. | 106/20 A |
| 5,009,536 | 4/1991 | Inoue et al. | 106/20 C |
| 5,017,226 | 5/1991 | Kulisz | 106/21 C |
| 5,043,013 | 8/1991 | Kluger et al. | 106/20 R |
| 5,082,386 | 1/1992 | Hironaka et al. | 407/206 |
| 5,106,881 | 4/1992 | Inoue et al. | 521/54 |
| 5,116,410 | 5/1992 | Miller | 106/22 B |
| 5,118,350 | 6/1992 | Prasad | 106/22 R |
| 5,120,359 | 6/1992 | Uzukawa et al. | 106/20 A |
| 5,139,572 | 8/1992 | Kawashima | 106/21 R |
| 5,176,746 | 1/1993 | Nakanishi et al. | 106/25 R |
| 5,196,243 | 3/1993 | Kawashima | 106/21 R |
| 5,203,913 | 4/1993 | Yamamoto et al. | 106/22 B |
| 5,215,956 | 6/1993 | Kawashima | 106/21 R |
| 5,222,823 | 6/1993 | Conforti | 106/22 B |
| 5,232,494 | 8/1993 | Miller | 106/22 B |
| 5,262,535 | 11/1993 | Kaiser | 106/22 B |
| 5,320,668 | 6/1994 | Shields et al. | 106/20 R |
| 5,326,388 | 7/1994 | Miller | 106/22 B |
| 5,352,282 | 10/1994 | Miller | 106/21 A |

WASHABLE COLOR CHANGING COMPOSITIONS

RELATED APPLICATIONS

This application is a continuation-in-part of previous U.S. patent application Ser. No. 08/089,503, now U.S. Pat. No. 5,326,388 which was a continuation-in-part of previous U.S. patent application Ser. No. 07/923,308 which issued as U.S. Pat. No. 5,232,494 on Aug. 3, 1993. This application is also a continuation-in-part of U.S. patent application Ser. No. 08/078,722, now U.S. Pat. No. 5,352,282 which was a continuation of previous U.S. patent application Ser. No. 07/923,308 which issued as U.S. Pat. No. 5,232,494 on Aug. 3, 1993.

FIELD OF THE INVENTION

This invention relates generally to the field of coloring compositions and more particularly to a pair of washable coloring compositions which may be used in conjunction with each other to enable laying down an initial mark using a first undercolor coloring composition yielding a first color and then using an overcolor coloring composition to enable a change of color of a portion or the entirety of the initial mark, both of which marks may be easily washed away from skin and fabric.

BACKGROUND OF THE INVENTION

Children enjoy various drawing and coloring activities using a variety of mediums. Useful in such activities are markers containing inks, crayons, pencils of various colors, and various paints including water colors, oil paints and acrylic paints. However, children would often like to change the color of a mark after they have made the mark. One instance would be the desire to add a yellow sun over a previously colored blue sky.

Changing the color of a mark is not readily done with the typical children's coloring instruments such as those described. In the past, children changed the marks by placing the mark of one color over the mark of another color. When performing this using traditional marking pens, the marks produced are often not the desired colors and the tips of the markers get soiled with the other inks, rendering the marker useless, If attempted with traditional children's paints, the colors tend to bleed together resulting in undesirable color smears. Therefore, there has been a long felt need for coloring compositions, including paints, inks, and markers containing such compositions, which produce marks of a first color that can be readily changed into a wide variety of second colors. Especially needed is such a group of compositions which may be used in markers without soiling the nib of the second used marking instrument.

Coloring compositions generally are mixtures of a coloring matter dispersed or dissolved in a carrier fluid. The colorant, if readily dissolving in the carrier fluid, is termed a dye. An insoluble coloring material is termed a pigment. Pigments are finely ground solid materials and the nature and amount of pigment contained in an ink determines its color.

In one available marker application, a child is able to change a specific initial mark laid down to a second specific color by applying a reducing agent to the first mark yielding a change in color. The marker inks used in these markers are typically prepared by blending a reducing agent (sometimes termed a bleaching agent) or pH sensitive dye with a dye that is stable in the presence of a reducing agent or high pH. For example, German Patent Specification No. 2724820, (hereinafter "the German Patent"), concerns the combining of a chemically stable dye and a chemically unstable dye in an ink formulation. Once a mark using this combination of stable and unstable dyes is laid down, the mark may be overwritten with a clear reducing agent solution, eliminating the color contribution of the unstable dye. The resulting mark of the stable dye, with its characteristic color, remains.

There are several drawbacks to such a marking system. First, there are strict limitations on the number of color changes which may be produced. Specifically, in formulations made according to the German Patent, the particular ink composition may only be changed from a first color to a fixed second color. For example, a green mark may only be changed to a violet color as the inks are described in the practice of the German Patent. In addition, since one of the required pair of markers contains only the reducing agent, that reducing agent marker cannot render a visible mark and may only be used in combination with the base color marker. Once the base color marker is used up, the reducing agent marker is of no use. Or, once the reducing agent marker is used up, the base color marker may only be used for the color which it initially marks with. A further disadvantage of the marking process of the German Patent is that the nib of the reducing agent marker tends to get soiled by picking up the colors of the base coloring composition, thus tainting the color of subsequent marks.

A further disadvantage to such previous marking systems is that they are not washable and thus not easily removed from skin, fabric or other surfaces. It is well known that a major deficiency of children's coloring markers is their propensity to leave enduring stains on both skin and clothing. While permanence is a desirable characteristic of the so-called "permanent" markers, it is one of the most objectionable of properties for coloring instruments used by young children. Accordingly, much effort has been expended over many years by producers of these instruments to reduce or eliminate staining. This is attested to by the rather numerous offerings of so-called "washable" markers, which on close examination, are found to remove very poorly from fabrics that are typically used in children's clothing. Most such markers achieve their limited washability by utilizing dyes which have good fugitivity from fabrics and by utilizing lowered dye concentrations in an effort to minimize skin staining. In all cases, however, these "washable" products leave objectionable stains on the skin. The inks used in such markers therefore lack fugitivity from skin.

Coloring compositions may optionally include such ingredients as humectants, preservatives, and drying agents. Humectants function to improve freeze/thaw stability and to control drying out of the tip when the coloring composition is used as a marker ink. Preservatives serve the obvious function of preventing spoilage of the ink during the expected shelf life of the marker product. Drying agents speed drying of a mark laid down by a marker.

Therefore, an object of the present invention is to provide a washable coloring composition system which is capable of enhanced multiple color changing abilities.

An additional object of the present invention is to produce a washable coloring composition system which includes at least two different coloring compositions each of which may be used independently or which may be used in combination to provide color changing ability.

A further object of the present invention is to provide a washable coloring composition system in the form of inks which prevents a nib of a color changing marker from becoming visibly soiled from contacting a base color composition.

A still further object is to provide a coloring composition which, in addition to being washable from the skin, is more easily washable from fabrics.

These and other objects will become apparent to those skilled in the art to which the invention pertains.

SUMMARY OF THE INVENTION

The present invention overcomes the drawbacks associated with prior overwriting ink compositions in that the particular undercolor coloring composition made according to the invention may be changed to multiple second colors, depending upon the dye present in the overcolor composition.

Advantageously, an overcolor coloring composition of the present invention makes a visible mark, thus it may be used alone or in combination with an undercolor coloring composition.

An additional advantage of the overcolor coloring composition of the present invention when used as an ink is that, unlike prior used color change markers, the nib of the marker containing the overcolor coloring composition does not become visibly soiled with the undercolor coloring composition color because the undercolor is immediately destroyed upon contact with the overcolor composition.

A further advantage of the overcolor and undercolor compositions of the present invention is that these compositions are washable from the skin, fabric and other surfaces.

In general, the present invention is a washable multiple coloring composition system wherein an undercolor coloring effect may be changed upon treatment with an overcolor second coloring composition. In one embodiment, the washable multiple coloring composition system comprises:

(a) an undercolor aqueous coloring composition comprising a surfactant in an amount sufficient to provide washability and an undercolor dye whose coloring ability is destroyed in the presence of a pH of about 10 or greater and/or in the presence of a reducing agent; and (b) an overcolor aqueous coloring composition comprising a surfactant in an amount sufficient to provide washability, a colorant capable of maintaining its characteristic color in the presence of a pH of about 10 or greater and/or in the presence of a reducing agent, and a base such that the pH of the overcolor composition is about 10 or greater and/or a reducing agent.

Suitable surfactants which provide washability to the compositions of the present invention include Dowfax 3B2, Tamol SN and Polytergent BN.

Also disclosed is a washable ink composition system comprising:

(a) an undercolor aqueous ink comprising a surfactant in an amount sufficient to provide washability and an undercolor dye whose coloring ability is destroyed in the presence of a reducing agent and/or a pH of about 10 or greater in an amount of from about 0.1 to about 15% by weight of the undercolor ink; and (b) an overcolor aqueous ink comprising from about 20% to about 55% of a surfactant which provides washability; from about 1% to about 20% by weight of said overcolor ink of a reducing agent; from about 0.1% to about 10% by weight of said overcolor ink of a base; and from about 0.1% to about 15% by weight of said overcolor ink of a colorant which maintains its characteristic color in the presence of a reducing agent and/or a pH of about 10 or greater.

A washable color changing marking system is also disclosed which comprises at least two marking instruments. The washable undercolor marking instrument contains an undercolor ink composition comprising a surfactant which provides washability to the composition and a dye whose coloring ability is destroyed in the presence of a reducing agent and/or a pH of about 10 or greater. The washable overcolor writing instrument contains an overcolor ink. The overcolor ink comprises (1) from about 20% to about 55% of a surfactant which provides washability; (2) from about 1% to about 20% by weight of reducing agent; (3) from about 0.1% to about 10% by weight of a base; and (4) from about 0.1% to about 15% by weight of a colorant which maintains its characteristic color in the presence of a reducing agent and/or a pH of about 10 or greater.

The coloring compositions of the invention may also optionally comprise a humectant, a drying agent, and a preservative.

DETAILED DESCRIPTION OF THE INVENTION

The present invention imparts the desirable ease of application and convenience of use of traditional color changer systems while avoiding the strict limitations of current color change markers. The composition of the present invention therefore imparts improved and convenient coloring properties as well as washability.

In general, the present invention is a washable multiple coloring composition system wherein the color of a mark laid down by an undercolor coloring composition, for example using a marker to dispense the composition, may be overwritten by a variety of second colors using an overcolor coloring composition over the undercolor coloring composition. An embodiment of this washable marking system comprises:

(a) an undercolor aqueous coloring composition comprising a surfactant in an amount sufficient to provide washability to said undercolor aqueous coloring composition and an undercolor dye whose coloring ability is destroyed in the presence of a reducing agent and/or a pH of about 10 or greater; and (b) an overcolor aqueous coloring composition comprising a surfactant in an amount sufficient to provide washability to said overcolor aqueous coloring composition, a colorant capable of maintaining its characteristic color in the presence of a reducing agent and/or a pH of about 10 or greater, and a reducing agent and/or a base in an amount sufficient to yield a pH of about 10 or greater.

To increase the pH of the overcolor aqueous coloring composition, a base in an amount sufficient to elevate the pH of the overcolor aqueous coloring composition to a level of about 10 or greater, and preferably from about 10 to about 12, is preferably used.

In a preferred embodiment, the overcolor aqueous coloring composition comprises both a reducing agent and a base in an amount sufficient to elevate the pH of the overcolor aqueous coloring composition to about 10 or greater and preferably from about 10 to about 12. Preferably, the overcolor composition has a high pH and a reducing agent so that the type of undercolor is unimportant. In this preferred embodiment, the washable marking system comprises:

(a) an undercolor aqueous coloring composition comprising a surfactant in an amount sufficient to provide washability and an undercolor dye whose coloring ability is destroyed in the presence of a reducing agent and/or in the presence of a pH of about 10 or greater; and (b) an overcolor aqueous coloring composition comprising from about 20% to about 55% of a surfactant; from about 1% to about 20% by weight of a reducing agent, a base in an amount sufficient to produce a pH of about 10 or greater, and from about 0.1% to about 15% by weight of a colorant capable of maintaining its characteristic color in the presence of a reducing agent and a pH of about 10 or greater.

Finally, a collection of washable multiple undercolor coloring compositions may be assembled, some of which contain a dye incapable of maintaining its characteristic color in the presence of a pH of about 10 or greater and some of which contain a dye incapable of maintaining its characteristic color in the presence of a reducing agent. For economic efficiency, in formulating overcolors for use with such a collection of undercolors, it is preferable to use an overcolor coloring composition which comprises (1) a surfactant which confers washability; (2) a colorant capable of maintaining its characteristic color in the presence of both a pH of about 10 or greater and a reducing agent, (3) a base, and (4) a reducing agent. In such a case, the overcolor coloring composition may be used to overwrite a mark made by any of the collection of undercolor coloring compositions without regard to whether the undercolor composition contains a dye which is incapable of maintaining its characteristic color in either the presence of an elevated pH or in the presence of a reducing agent.

A surfactant is present in the undercolor coloring compositions of the present invention to impart washability to the compositions. Any compatible surfactant which confers such washability is suitable provided excessive strike through does not result. Examples of suitable surfactants include anionic surfactants such as disulfonated products manufactured by The Dow Chemical Company and sold under the trademark Dowfax, specifically Dowfax 3B2 and Dowfax 8390, sodium naphthalene sulfonate which is manufactured by Rohm & Haas and sold under the trademark Tamol SN, and a proprietary product which is manufactured by Olin Chem and sold under the trademark Polytergent BN (U.S. Pat. No. 5,262,535), and the surfactant disclosed and claimed in U.S. Pat. No. 5,262,535 which is incorporated herein by reference. Other surfactants which contribute to washability of the undercolor coloring compositions are identified in Table I as disclosed in U.S. Pat. No. 5,116,410, which is incorporated herein by reference.

TABLE I

| Surfactant (Source) | Chemical Description |
| --- | --- |
| Aristonate 430 (Pilot Chemical Co.) | sodium alkyl benzene sulfonate |
| Aristonate 460 (Pilot Chemical Co.) | sodium alkyl benzene sulfonate |
| Aristonate 500 (Pilot Chemical Co.) | sodium alkyl benzene sulfonate |
| Blancol N (GAF Corp.) | sodium salt of sulfonated naphthalene - formaldehyde condensate |
| Conco Sulfate 2A1 (Continental Chemical Co.) | sodium alkyl dipenyl oxide sulfonate |
| Darvan #2 (R. T. Vanderbilt Co.) | sodium salts of polymerized substituted benzoid alkyl sulfonic acids |

TABLE I-continued

| Surfactant (Source) | Chemical Description |
| --- | --- |
| Darvan 404 (R. T. Vanderbilt Co.) | calcium salts of polymerized substituted benzoid alkyl sulfonic acids |
| Daxad 11 (W. R. Grace Co.) | sodium salts of polymerized alkyl naphtalenic sulfonic acids |
| Daxad 17 (W. R. Grace Co.) | sodium salts of polymerized alkyl naphthalenic sulfonic acids |
| Daxad 19 (W. R. Grace Co.) | sodium salts of polymerized alkyl naphthalenic sulfonic acids |
| Daxad 23 (W. R. Grace Co.) | sodium salts of polymerized alkyl naphthalenic sulfonic acids |
| Kara Sperse DDL (Lyndal Chemical Co.) | sodium organic sulfonate |
| Kara Sperse DDL-12 (Lyndal Chemical Co.) | modified sulfonate |
| Lomar D (Diamond Shamrock Co.) | sodium salt of condensed mononaphthalenic sulfonic acids |
| Lomar LS (Diamond Shamrock Co.) | sodium salt of condensed mono naphthalenic sulfonic acids |
| Petro-D-425 (DeSoto Inc.) | sodium salt of sulfonated naphthalene formaldehyde condensate |
| Stepantan A (Stepan Co.) | condensed naphthalene sulfonate |
| Turkey red oil | sulfated castor oil |

The most preferable surfactant for use in the washable compositions of the present invention is Dowfax 3B2. Dowfax 3B2 is a diphenyl oxide disulfonate having tough cleaning product applications, particularly on synthetic fabrics as well as cotton and synthetic blends.

Not all surfactants confer washability on the undercolor coloring compositions of the present invention. For example, non-ionic surfactants and aliphatic sulfonates have not been found to be effective surfactants for the coloring compositions of the present invention.

The surfactant should be present in an amount which is sufficient to impart washability to the coloring compositions. Generally, 20% by weight may be sufficient, but as much as 55% may be desirable. Preferably, a surfactant content of about 25% to about 35% by weight is present, and most preferably about 28% to about 32% by weight.

Use of citric acid or other antioxidants may be desirable for these undercolor formulations because it helps dye stability. It may also assist washability of the coloring compositions from fabric and is thus, preferably present in undercolor compositions.

Most suitable for use as dyes in the undercolor coloring compositions are dyes whose coloring capabilities are easily destroyed by a reducing agent. Such coloring compositions are commonly known in the field and are occasionally used as chemically "erasable" inks. Also suitable for use as dyes in the undercolor coloring compositions are dyes whose coloring capabilities are easily destroyed in the presence of a pH of about 10 or greater. Dyes must also be compatible with the surfactant. Especially suitable for use as dyes in the undercolor coloring composition are polymethine dyes, triphenylmethane dyes, cyanine dyes, methine dyes, and azo dyes which are unstable in the presence of a pH of about 10 or greater and/or are unstable in the presence of a reducing agent. Such dyes include the dyes marketed under the tradenames BASACRYL X-RL YELLOW™ (Basic Yellow 49), marketed by the BASF Corporation, ASTRAZON BLUE FRR™ (Basic Blue 69), ASTRAZON BRILLIANT RED 4G™ (Basic Red 14), and ASTRAZON PINK FBB™ (Basic Red 49) by Miles(Mobay); and the dyes marketed under the tradenames Acid Green 3 by International Dyestuffs Corporation, Acid Blue 93 and Acid Violet 19 marketed by Spectra Color Corporation as well as mixtures thereof.

The listed ASTRAZON dyes are classified as polymethine dyes. Polymethine dyes are colored substances in which a series of —CH= (methine) groups connect to terminal groups of a chromophore. Polymethine and cyanine are often used interchangeably as generic terms for all polymethine dyes. The previous primary usage for polymethine dyes are dying acetate rayon as well as polyacrylnitrile and polyacrylamide. Acid Green 3, Acid Blue 93 and Acid Violet 19 are triphenylmethane dyes. Acid Green 3 is commonly used in making pulp colors or lakes. Acid Violet dyes are primarily fashion colors.

To achieve good coloring of the undercolor coloring composition, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 1% to about 6% dye by weight of the composition. A concentration of about 1.5% to about 4% is even more preferred when the undercolor coloring composition is to be used as an ink for a typical marker to ensure good coloration.

The overcolor coloring composition of the present invention is preferably formulated by combining a surfactant, a reducing agent and a base with a colorant which maintains its characteristic color in the presence of reducing agent and in high pH conditions. Of course, where colorants used in the undercolor composition are only affected by a reducing agent, the base may be deleted. Also, where dyes used in the undercolor composition are only affected by an elevated pH, the reducing agent may be eliminated. However, for maximum commercial application and for maximum effect upon a wider variety of undercolor compositions, the overcolor composition is preferably formulated with a reducing agent and base in combination.

A limited number of dye colorants meet this criteria. Dyes to be used in the overcolor coloring composition must be highly resistant to chemical attack such as from a reducing agent or high pH conditions. Dyes meeting this criteria include xanthene dyes, pthalocyanine dyes, and azo dyes which are stable in the presence of a pH of about 10 or greater and/or are stable in the presence of a reducing agent. Dyes which have been found to meet these criteria include PYRANINE 120™ (which is commonly known as Solvent Green 7) marketed by Miles(Mobay), Acid Red 52 marketed by Carolina Color, Food Red 14 marketed by Hilton-Davis, BASANTOL GREEN 910™ (which is commonly known as Acid Green 26) marketed by BASF, Acid Red 87 marketed by Hilton-Davis, Acid Red 92 marketed by International Dyestuffs Corporation, Acid Red 388 and Direct Blue 199 marketed by Crompton & Knowles, and mixtures thereof.

Acid Red dyes, classified as xanthene dyes, are generally used as colorants for foods, drugs and cosmetics. Specifically, Acid Red 87, is the disodium salt of 2,4,5,7 -tetrabromo-9-o-carboxyphenyl-6-hydroxy -3-isoxanthone. Acid Red 87 is also called D & C Red No. 22 by the Food and Drug Administration ("FDA"), and sold under the tradenames Eosine YS and Eosine G. In addition, Acid Red 92, the disodium salt of 2,4,5,7-tetrabromo-9-3,4,5,6 tetrachloro-o-carboxylphenyl)- 6-hydroxy-3-isoxanthone, is called D & C Red No. 28 by the FDA, and sold under the tradename Phloxine B. Acid Red 52 is a colorant for plastics. Further, Food Red 14 or FD&C Red No. 3, commercially available under the tradenames Erythrosine and Erythrosine Bluish, is the disodium salt of 9(o-carboxyphenyl)-6-hydroxy-2,4,5,7 -tetraiodo-3H-xanthen-3-one, which contains smaller amounts of lower iodinated fluoresceins.

To achieve good coloring of the overcolor coloring composition, the minimum concentration of dye which will produce a workable ink is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. It is also a function of the characteristics of the desired end product, though a practical upper limit in the formulation of, for example, a marker ink, is about 15% by weight. The preferred concentration range for most applications is from about 1% to about 6% dye by weight of the composition. A concentration of about 1.5% to about 4% is even more preferred when the overcolor coloring composition is to be used as an ink for a typical marker to ensure good coloration.

A surfactant is present in the overcolor coloring compositions of the present invention to impart washability to the compositions. Any compatible surfactant which confers such washability is suitable provided excessive strike through does not result. Examples of suitable surfactants include anionic surfactants such as disulfonated products manufactured by The Dow Chemical Company and sold under the trademark Dowfax, specifically Dowfax 3B2 and Dowfax 8390, sodium naphthalene sulfonate which is manufactured by Rohm & Haas and sold under the trademark Tamol SN, and a proprietary product which is manufactured by Olin Chem and sold under the trademark Polytergent BN. Other surfactants which contribute to washability of the undercolor coloring compositions are identified in Table I. The most preferable surfactant for use in the washable compositions of the present invention is Dowfax 3B2. Dowfax 3B2 is a diphenyl oxide disulfonate having tough cleaning product applications, particularly on synthetic fabrics as well as cotton and synthetic blends.

Not all surfactants confer washability on the undercolor coloring compositions of the present invention. For example, non-ionic surfactants and aliphatic sulphonates are not effective surfactants for the coloring compositions of the present invention.

The surfactant should be present in an amount which is sufficient to impart washability to the coloring compositions. Generally, 20% by weight may be sufficient, but as much as 55% may be desirable. Preferably, a surfactant content of about 25% to about 35% by weight is present, and most preferably about 28% to about 32% by weight.

Typical reducing agents for use in the overcolor coloring composition of the invention include hydrogen sulfide, sodium sulfite, sodium bisulfite, and stannous chloride. Certain limited bleaches which act as weak oxidizing agents such as sodium hypochloride and hydrogen peroxide may also operate to effect a color change. Hydrogen peroxide is also known to sometimes operate as a weak reducing agent. The preferred reducing agent for use in the coloring composition of the invention is $Na_2SO_3$ (sodium sulfite). Reducing agent is generally present in the overcolor coloring composition of the invention in an amount from about 1% to about 20% with a minimal amount required to allow for the elimination of the undercolor coloring composition of the invention and the maximum amount determined by the stability of the composition and the safety of the composition for use by children. Preferably, the reducing agent is contained in the overcolor coloring composition in an amount of from about 5% to about 15%, and most preferably in an amount of from about 8% to about 12% by weight of the overcolor coloring composition.

Overcolor coloring compositions of the invention may be formulated using only a reducing agent. However, the reducing agents used in overcolor coloring compositions of the invention perform most effectively in the presence of an elevated pH. To elevate the pH of the overcolor coloring composition, a base is added. Bases which may be used in the overcolor coloring composition of the invention are typically strong bases, usually having a pH of from about 10 to about 12. Typical bases which may be employed in the overcolor coloring composition of the invention include ammonium hydroxide, sodium hydroxide, and sodium carbonate. The preferred base is sodium hydroxide.

The base is generally present in the overcolor coloring composition of the invention in an amount from about 0.1% to about 20% by weight. Preferably, the base is added in an amount sufficient to raise the pH of the composition to a pH of from about 10 to about 12. Preferably, the base is contained in the overcolor coloring composition in an amount of from about 5% to about 15%, and most preferably from about 10% to about 12% by weight of the overcolor coloring composition.

The water used in the undercolor coloring composition and the overcolor coloring composition of the invention present invention is preferably deionized water. The amount of water present in undercolor coloring compositions is typically from about 10% to about 90% and this amount is in large part determined by the desired end use of the undercolor coloring composition, for instance, as an ink or a paint, and the amount of other components included in the undercolor color composition. To achieve a desirable viscosity when the undercolor coloring composition is used in the form of, for example, an ink, water is preferably present in an amount of from about 20% to about 80%, and most preferably from about 45% to about 60% by weight of the composition.

The amount of water present in the overcolor coloring composition of the invention is also governed in large part by the desired end use of the composition, for instance, as an ink or a paint, and the amount of other components included in the undercolor coloring composition. The amount of water present in overcolor coloring compositions is typically from about 10% to about 90%. To achieve a desirable viscosity when the overcolor coloring composition is used in the form of, for example, an ink, water is preferably present in an amount of from about 20% to about 80%, and most preferably from about 45% to about 60% by weight of the composition.

Optionally, both the undercolor coloring composition and the overcolor coloring composition may further comprise such additives as humectants, drying agents and preservatives such as biocides and fungicides.

Addition of a humectant ensures that coloring compositions of the invention, when in the form of an ink, do not prematurely dry in a capillary marking system, such as a bonded fiber marking nib. Typical humectants which may be employed in the coloring compositions of the present invention include polyhydric alcohols such as ethylene glycol, propylene glycol, hexylene glycol and poly(ethylene glycol), and hydroxylated starches. The humectant is preferably glycerin.

The humectant is generally used in an amount of from about 0% to about 30% by weight of the composition, though this range is by no means critical. The amount of humectant to be added is determined by the type of nib used in the writing or marking instrument to be employed and the protection time period desired. In one preferred composition, the humectant, glycerin, is added in an amount of from about 3% to about 15% by weight of the coloring composition.

To achieve a more rapid drying rate and to improve marking characteristics upon nonporous materials, a drying agent may be added to increase the overall volatility and therefore the evaporation rate of the water and the pH regulant. Any compatible material which performs this function may be used.

The drying agent preferably should be a volatile polar material so as to ensure compatibility with the primary components of the marker ink. Straight chain C2–C4 alcohols are good, highly volatile drying agents, and of these, ethanol is preferred because of its relatively low cost and because it does not contribute any unpleasant odor to the composition. Alcohols can also provide added benefits, such as reducing surface tension, increasing adherence of the ink to porous surfaces, and providing bactericidal activity when added to the ink composition.

To discourage improper usage of the marker ink, such as ingesting the ink, the alcohol may contain a bittering agent or a conventional denaturant. An alcohol utilizing a bittering agent will discourage such improper usage of the ink by simply imparting a disagreeable taste, while not requiring the use of toxic denaturants as methanol or benzene, and is therefore preferred. A conventional denatured alcohol may, of course, also be utilized. The most preferred drying agent is an ethyl alcohol which contains a bittering agent and which is sold under the trade name SDA 40B, manufactured by Aaper Alcohol.

When utilized, the drying agent preferably is added from about 5% up to about 30% by weight, with the most preferred concentration being about 8–10% by weight, though these amounts are not critical to the practice of the invention. About 8% per weight of drying agent is ordinarily required to ensure rapid drying of the ink on a nonporous surface, while amounts in excess of about 30% by weight may adversely affect stability of the ink and may cause flocculation of the pigment unless other stabilizing additives are employed.

To maintain the shelf life of the composition, a preservative may be added. The preservative preferably serves as both a bactericide and a fungicide, and is added in any effective amount, though a typical concentration range is from about 0.1% up to about 5.0% by weight. The use of preservatives in levels greater than about 5% by weight may cause the ink to become toxic or unstable and may, in any event, be unnecessary. Should alcohol be added to the composition as a drying agent, that alcohol will function as a preservative to some extent also.

Any conventional preservative may be utilized in the invention as long as there is compatibility with the remaining ink components. For example, preservatives manufactured by Dow Chemical Co. and sold under the trademarks Dowicil 75 (1-(3-chloroallyl)-3,5,7-triaza-1-azoniaadamantane chloride) and Dowicil 200 (3-chlorovinyl-hexamethylene tetrammonium chloride) or a preservative manufactured by Rohm and Haas and sold under the trademark Kathon PFM (isothiazolinones), or a preservative manufactured by Sutton Labs and sold under the trademark Germall II (imazolidinyl urea), or a preservative manufactured by Merck and sold under the trademark Tektamer 38 (1,2 dibromo-2, 4-dicyanobutane), will work in the composition of the invention.

Other acceptable preservatives include TROYSAN POLYPHASE P100™, a 3-Iodo-2-Propynyl Butyl Carbamate sold by Troy Chemical commonly combined in solution with PVP K-30™, a 2-Pyrrolidinone, 1-Ethenyl-, Homopolymer solubilizer $((C_6MgNO)_x$ sold by ISP Technologies Inc., and M-PYROL™, a 1-Methyl-Pyrrolidinone solubilizer sold by GAF Chemicals Corporation. Addition of preservatives to the undercolor and overcolor coloring compositions inhibits the growth of bacteria and fungi in water-based products.

Typically, a child may make marks or color a picture using one or more markers containing various undercolor coloring compositions on a suitable substrate, such as paper. The child may then select one or more markers containing various overcolor coloring compositions of the invention. The child may then overwrite a portion or all of the previously made markings eliminating the color of the undercolor coloring composition as applied and leaving only the color of the overcolor coloring composition used to overwrite the undercolor color composition. Because of the surprisingly strong and immediate impact of the overcolor coloring composition used to overwrite the undercolor coloring composition, the overcolor marker appears to paint a color over the undercolor on the portions of the substrate on which it is applied.

A child may also apply the overcolor coloring composition directly to the substrate. If an undercolor coloring composition is then used to overwrite the mark laid down by the overcolor coloring composition, the overcolor coloring composition will eliminate the color contributed by the undercolor coloring composition leaving only the color of the overcolor coloring composition where that mark was previously made. The undercolor color will be seen on other locations on the substrate. This change has been observed to occur more slowly than when the overcolor coloring composition is applied over the undercolor coloring composition. This slowed reaction is presumably caused by the penetration of the overcolor coloring composition into the paper substrate. The child gains great play benefit by viewing this slowly disappearing color.

Preferably, when the coloring compositions of the invention are used in the form of inks, the inks are placed in conventional markers using such nibs as bonded fiber or sintered plastic. Various undercolor coloring compositions are placed in an undercolor set of markers, each containing an appropriate different color dye. Various overcolor coloring compositions of the invention are placed in a second group of markers, each of these compositions containing an appropriate different color colorant, either a dye or pigment.

Preferably, when the coloring compositions of the invention are used in the form of inks, the inks are placed in conventional markers. These markers utilize reservoirs for storing the ink and nibs to dispense the ink. Typically, an ink reservoir contains a sponge like reservoir which hold the thee ink. The preferred reservoirs for undercolor coloring compositions of the invention are made of acetate, polyester or polypropylene. The preferred reservoirs for overcolor coloring compositions of the invention are made of polypropylene which more suitably resists attack by any reducing agent contained in the overcolor coloring composition.

In general, any suitable nib may be used in conjunction with the undercolor coloring compositions of the invention. However, where nylon or polyamide fibers are used, they should be checked for preferential dye absorption. Also, any compatible nib may be used in conjunction with the overcolor coloring compositions of the invention. Sintered polyethylene nibs are preferred and nylon and polyamide nibs should be checked for preferential dye absorption. In general, bonded polyester fiber nibs are not suitable for use with the overcolor coloring compositions of the invention. Various undercolor coloring compositions are placed in an undercolor set of markers, each containing an appropriate different color dye. Various overcolor coloring compositions of the invention are placed in a second group of markers, each of these compositions containing an appropriate different color colorant, either a dye or pigment. A marking kit or system is thus formed which comprises both overcolor coloring compositions and undercolor coloring compositions.

The washable coloring compositions of the present invention may be contained in a marker having a reservoir and a nib wherein the reservoir contains an undercolor aqueous coloring composition comprising a compatable surfactant in an amount sufficient to confer washability and an undercolor dye whose coloring ability is destroyed in the presence of a ph of about 10 or greater, or an overcolor aqueous composition comprising a compatable surfactant in an amount sufficient to confer washability, a colorant capable of maintaining its characteristic color in the presence of a pH of about 10 or greater and an effective amount of a reducing agent and/or base sufficient to yield a pH of about 10 or greater.

EXAMPLES

Test Procedures

A. The fugitivity from skin of the compositions of the invention was measured by the following test:

1. Wash hands with soap and warm water. The pre-stain cleansing removes excess oil and dirt from the skin and provides a more consistent skin surface for testing. Allow the skin to dry for 30 seconds.

2. In the case of a marker, draw a stripe on the palm of the hand with the flat side of the nib. In the usual case, a ¼ inch wide by 1 inch long stripe works well. Apply enough pressure and/or multiple passes to develop a stripe with good color intensity. If it is desired to make a comparison among two or more compositions, more than one stripe may be drawn. Let stripes dry for one minute.

3. Place hand under tap and briefly rinse off excess ink with warm water.

4. Wash hands with soap in the following manner: lather using a minimum amount of soap; replace soap in soap dish; rub hands together briskly with modest pressure for 30 seconds; rinse away soap.

5. Wipe hands dry with paper towels, and complete the drying with a relatively dry towel. A dry towel will help to rub off residual traces of ink.

6. Evaluate removability from skin by assigning a score of between 1 and 5, with a score of 1 indicating essentially complete removability and a score of 5 indicating essentially no removability.

7. If removal of the marks is incomplete, repeat steps 4 through 6.

B. The fugitivity from fabric of the compositions of the invention was measured by the following test.

1. Cut test swatches of a standard white 50% cotton, 50% polyester fabric to 6"×7" (15.2 cm×17.8 cm) to identify fabric direction.
2. Pre-washed swatches with bleach, non-staining water softener and ordinary household phosphate detergent powder using 120–F hot water as directed in ASTM D4265-83.
3. Pull test swatches taut in a 12.5 cm diameter embroidery hoop.
4. Deposit marker inks dropwise onto the fabric onto a circular area about 8 cm in diameter. If the ink chromotographs to give a strongly colored ring at the circumference of the stained circle, pre-wet the fabric adjacent to the hoop with water so that inward wicking of the water counteracts the outward wicking of the ink. Permit the stained area to expand to its equilibrium diameter prior to drying.
5. Remove the stained sample from the hoop and allow to "age" for a predetermined time (usually 24 hours).
6. Staple a group of stained swatches with heavy duty staples to the edges of a bath towel. Rinse in cold water to remove excess dye.
7. Add a dummy load of unstained fabrics to provide a four pound wash load. Wash the load for 12 minutes with a hot (120–F)/cold cycle.
8. Dry the load in a dryer.
9. Detach the test swatches from the carrier towel, iron, and measure their color on the colorimeter.

Evaluation of Test Data

Skin fugitivity data are based on a visual rating system as follows:

5=severe

4=moderate

3=slightly more visible

2=slightly visible

1=barely visible

0=no stain

For each additive screened, skin fugitivity was improved over the control, which was rated at 2.

Fabric fugitivity data, stated in terms of E values, correspond to visual observations as follows:

| E = up to 2.2 | no visible stain |
| --- | --- |
| E = 2.20–2.90 | trace |
| E = 2.90–4.90 | slight |
| E = 4.90–6.40 | moderate |
| E = over 6.40 | heavy |

For most additives screened, at least a modest increase in fabric fugitivity was observed.

Coloring Compositions

Examples of marking systems of the present invention when formulated as an ink are as follows. Quantities are in percent by weight of the total composition.

| Undercolor Color Ink Examples | | |
| --- | --- | --- |
| Component | Example 1 Red Ink % | Example 2 Green Ink % |
| Deionized Water | 53.7 | 53.7 |
| Dowfax 3B2 | 30.0 | 30.0 |
| Glycerin | 10.0 | 10.0 |
| Preservative Premix | | |
| M-Pyrol | 2.4 | 2.4 |
| PVP 30 | 0.05 | 0.05 |
| Troysan Polyphase P-100 | 0.05 | 0.05 |
| Nuosept | 0.5 | 0.5 |
| Citric Acid | 0.3 | 0.3 |
| Dye | | |
| Basic Red 14 | 3.0 | — |
| Acid Green 3 | — | 2.0 |

| Component | Example 3 Blue Ink % | Example 4 Black Ink % |
| --- | --- | --- |
| Deionized Water | 53.7 | 53.7 |
| Polytergent BN | 30.0 | 30.0 |
| Glycerin | 10.0 | 10.0 |
| Preservatives | | |
| Nuosept 95 | 4.0 | 4.0 |
| Premix | 2.5 | 2.5 |
| M-Pyrol | 2.4 | 2.4 |
| PVP 30 | 0.05 | 0.05 |
| Troysan Polyphase P-100 | 0.05 | 0.05 |
| Citric Acid | 0.3 | 0.3 |
| Dye | | |
| Acid Blue 93 | 2.3 | — |
| Acid Violet 19 | — | 0.7 |
| Acid Green 3 | — | 2.3 |

| Component | Example 5 Green Ink % | Example 6 Red Ink % |
| --- | --- | --- |
| Deionized Water | 63.7 | 63.7 |
| Tamol SN | 25.0 | 25.0 |
| Glycerin | 5.0 | 5.0 |
| Preservative | | |
| Nuosept 95 | 0.5 | 0.5 |
| Premix | 2.5 | 2.5 |
| M-Pyrol | 2.4 | 2.4 |
| PVP 30 | 0.05 | 0.05 |
| Troysan Polyphase P-100 | 0.05 | 0.05 |
| Citric Acid | 0.3 | 0.3 |
| Dye | | |
| Acid Green 3 | 2.0 | — |
| Basic Red 14 | — | 3.0 |

The inks of examples 1 through 6 had acceptable working properties, including washability, and are especially suitable for overcolor elimination by an overcolor coloring composition containing a reducing agent. The black ink of Example 4 reddens somewhat after drying. The use of Tamol Sn in Example 5 improves washability of the acid green dye, but shifts the color of the dye. The inks of examples 5 and bleach completely and immediately and are completely washable. The ink of example 5 has a skin fugitivity of 0.5 and the ink of Example 6 has a skin fugitivity of 0.

Overcolor Coloring ink Examples

| Component | Example 7 Pink Ink % | Example 8 Green Ink % | Example 9 Blue Ink % |
|---|---|---|---|
| DI Water | 42.75 | 42.47 | 42.96 |
| Glycerin | 5.00 | 5.00 | 5.00 |
| Na$_2$SO$_3$ | 10.20 | 10.20 | 10.20 |
| NaOH (5N Soln) 20% Solution | 11.05 | 11.05 | 11.05 |
| Dowfax 3B2 | 30.00 | 30.00 | 30.00 |
| Dye | | | |
| Acid Red 388 | 1.00 | — | — |
| Pyranine 120 | — | 0.43 | — |
| Direct Blue 199 | — | 0.28 | 0.84 |

| Component | Example 10 Yellow Ink % | Example 11 Blue Ink % |
|---|---|---|
| DI Water | 42.05 | 37.75 |
| Glycerin | 5.00 | 10.00 |
| Na$_2$SO$_3$ | 10.20 | 10.20 |
| NaOH (5N Soln) 20% Solution | 11.05 | 11.05 |
| Dowfax 3B2 | 30.00 | — |
| Dowfax 8390 | — | 30.00 |
| Polytergent BN | — | — |
| Dye | | |
| Pyranine 120 | 1.30 | — |
| Direct Orange 102 | 0.40 | — |
| Acid Red 388 | — | — |
| Direct Blue 199 | — | 0.84 |

The inks of examples 7–11 had acceptable working properties. The inks of examples 7 and 8 have a viscosity of 4.91 cps and pH of 12.3 and 12.2, respectively. The inks of examples 7–9 are completely washable from the skin by mere rinsing with water without soap. The inks of 7–10 have skin fugitivity values of 0, 0.5, 1.0, and 0, respectively, 6 and fabric fugitivity (E) values of 0, 0, 0.5, and 2.0.

In using the various above described overcolor coloring compositions and undercolor coloring compositions, a child could place a mark of the undercolor blue coloring composition on paper, perhaps to paint the sky. If the child wishes to add in a yellow sun, a green tree growing up into the blue sky, and red flowers growing into the blue sky into the picture, the child may easily use the above-indicated overcolor coloring ink compositions, without tainting any of the colors. Alternatively, if the child draws a sun using the yellow overcolor coloring composition, he or she may draw in the sky using the blue undercolor ink right over the yellow without spoiling the colors.

The multiple coloring composition system of the invention may also be formulated as a paint. When compositions of the invention are formulated as a paint, such as a child's paint, they must necessarily be formulated with a higher viscosity to enable to the application of the of the paint with a brush. This viscosity is achieved in two ways. In formulating an undercolor coloring composition, a binder may generally be added to the composition. This binder may be in the form of a modified starch such as STADEX 140™ marketed by A. E. Staley Manufacturing Company. Binders are typically used in amounts of from about 0% to about 25% by weight of the composition.

Additionally, paints may contain a thickener to provide body to the paint. One suitable thickener is STAR-POL™ 560, a modified starch thickener, marketed by A. E. Staley Manufacturing Company. Another suitable thickener, especially for use in elevated pH compositions such as the overcolor coloring composition of the invention is LAPONITE RDS™, a synthetic hectorite. The amount of thickener used depends upon the amounts of binder and other components used in the composition, although typically about 1% to about 5% by weight thickener is used.

Paints may also contain a filler or extender. Fillers and extenders are generally solid particles added to paint compositions which provide body to the paint but which do not provide color. Common extenders are talcs, such as magnesium silicate hydrate, and clays and two suitable extenders for compositions of the invention are TALCRON MP™ 45-26 marketed by Pfizer Inc. and IMSIL A-108™. Extenders may be used in amounts of from about 0% to about 40% by weight of the composition. Where extenders or pigments are used in a paint, a dispersant may also be used to maintain the solid particles dispersed in the paint. Dispersants, such as NOPCOSPERSE 44™, are typically used in amounts of from about 0.1% to about 5%. Also, many paints optionally include a freeze/thaw protector. Freeze/thaw additives improve the stability of the paint over widely varying temperatures. One suitable freeze/thaw protector is propylene glycol which is effective when used in compositions of the invention in amounts from about 1% to about 10% by weight, with the most preferred range being from about 1.5% to about 6.5% by weight.

In a further embodiment of the present invention, a variety of undercolor colors may be painted or otherwise applied on a substrate, such as paper, and the substrate, with these colors applied could be supplied to a child in combination with the overcolor coloring composition in the form of a paint or an ink in a marker. An appropriate overcolor coloring composition could then be applied onto the substrate in areas where the child desired a change of color to produced the desired color change.

From the foregoing description and examples, it is apparent that the objects of the present invention have been achieved. While only certain embodiments have been set forth, alternative embodiments and various modifications will be apparent to those skilled in the art. These and other alternatives are considered equivalents and within the spirit and scope of the present invention. All patents and patent applications referenced herein are hereby incorporated herein in their entirety by reference.

What is claimed is:

1. A washable multiple coloring composition system comprising:

(a) an undercolor aqueous coloring composition comprising a compatible surfactant in an amount sufficient to provide washability to said undercolor aqueous coloring composition and an undercolor dye whose coloring ability is destroyed in the presence of a pH of about 10 or greater; and (b) an overcolor aqueous coloring composition comprising a compatible surfactant in an amount sufficient to provide washability to said overcolor aqueous coloring composition, a colorant capable of maintaining its characteristic color in the presence of a pH of about 10 or greater and an effective amount of a base sufficient to yield a pH of said overcolor aqueous coloring composition of about 10 or greater.

2. The multiple coloring composition system of claim 1, said base being present in an amount sufficient to yield a pH of said overcolor aqueous coloring composition of from about 10 to about 12.

3. The multiple coloring composition system of claim 1, said surfactant in said overcolor aqueous coloring composition being present in an amount from about 20% to about 55% by weight.

4. The multiple coloring composition system of claim 2, said base added in an amount of from about 0.1% to about 20% by weight of said overcolor aqueous coloring composition.

5. The multiple coloring composition system of claim 1, wherein said undercolor dye of said undercolor coloring composition is selected from the group consisting of polymethine dyes, triphenylmethane dyes, cyanine dyes, methine dyes, and azo dyes which are unstable in the presence of a pH of about 10 or greater.

6. The multiple coloring composition of claim 5, wherein said undercolor dye of said undercolor coloring composition is selected from the group consisting of Basic Blue 69, Basic Red 14, Basic Red 49, Acid Green 3, Acid Violet 19 and mixtures thereof.

7. The multiple coloring composition system of claim 1, wherein said colorant of said overcolor coloring composition is selected from the group consisting of, xanthene dyes, pthalocyanine dyes, and azo dyes which are stable in the presence of a pH of about 10 or greater.

8. The multiple coloring composition system of claim 1, wherein said colorant of said overcolor coloring composition is selected from the group consisting of Acid Red 52, Acid Red 87, Acid Red 92, Acid Red 388, Food Red 14, Acid Green 26, Solvent Green 7, Direct Blue 199, and mixtures thereof.

9. The multiple coloring composition system of claim 1, wherein said overcolor aqueous coloring composition further comprises a reducing agent.

10. The multiple coloring composition system of claim 9, wherein said reducing agent is selected from the group consisting of hydrogen sulfide, sodium sulfite, sodium hypochlorite and hydrogen peroxide.

11. The multiple coloring composition system of claim 1, wherein said base is selected from the group consisting of ammonium hydroxide, sodium hydroxide and sodium carbonate.

12. The multiple coloring composition system of claim 1, wherein said undercolor and said overcolor coloring compositions further comprise a humectant in an amount of from about 0% to about 30% by weight.

13. The multiple coloring composition system of claim 1, wherein said undercolor and said overcolor coloring compositions further comprise a drying agent in an amount of from about 5% to about 30% by weight.

14. The multiple coloring composition system of claim 1, wherein said colorant of said overcolor aqueous coloring composition is present in an amount of from about 0.1% to about 15% by weight.

15. The multiple coloring composition system of claim 1, wherein said undercolor and said overcolor coloring compositions further comprise a preservative.

16. The multiple coloring composition system of claim 15, wherein said preservative is present in said undercolor and said overcolor coloring compositions in an amount of from about 0.1% to about 5% by weight.

17. A washable ink composition system comprising:

(a) an undercolor aqueous ink comprising a compatible surfactant in an amount sufficient to provide washability and an undercolor dye whose coloring ability is destroyed in the presence of a pH of about 10 or greater in an amount of from about 0.1% to about 15% by weight of the undercolor ink; and (b) an overcolor aqueous ink comprising from about 20% to about 55% by weight of a compatible surfactant; from about 1% to about 20% by weight of said overcolor ink of a reducing agent; from about 0.1% to about 10% by weight of said overcolor ink of a base; and from about 0.1% to about 15% by weight of said overcolor ink of an overcolor colorant which maintains its characteristic color in the presence of a reducing agent and a pH of about 10 or greater.

18. The ink composition system according to claim 17, wherein said base is present in an amount of from about 0.1% to about 20% by weight.

19. The ink composition system according to claim 17, wherein said undercolor dye and said overcolor colorant are each present in an amount of from about 1% to about 6% by weight.

20. A washable color changing marking system comprising at least an undercolor marking instrument and an overcolor marking instrument, said undercolor marking instrument containing from about 20% to about 55% of a compatable surfactant and an undercolor ink composition comprising a dye whose coloring ability is destroyed in the presence of a pH of about 10 or greater, and said overcolor marking instrument containing an overcolor ink, said ink comprising (1) from about 20% to about 55% of a compatible surfactant;

(2) from about 0.1% to about 10% by weight of a base; and (3) from about 0.1% to about 15% by weight of a colorant which maintains its characteristic color in the presence of a pH of about 10 or greater.

21. The marking system of claim 20, wherein said overcolor ink further comprises a reducing agent.

22. The marking system of claim 21 wherein said reducing agent is sodium sulphite.

23. The marking system of claim 20, wherein said base is sodium hydroxide.

24. The marking system of claim 21, wherein said system further comprises at least a third marking instrument, said third marking instrument containing an undercolor ink composition comprising a dye whose coloring ability is destroyed in the presence of a reducing agent.

25. The marking system of claim 20, wherein said marker comprises and ink reservoir coupled to a nib.

26. A washable paint composition system comprising:

(a) an undercolor aqueous paint comprising from about 20% to about 55% of a compatible surfactant and an undercolor dye whose coloring ability is destroyed in the presence of a pH of about 10 or greater; and (b) an overcolor aqueous paint comprising from about 20% to about 55% of a compatible surfactant; from about 0.1% to about 20% by weight of a base; from about 0.1% to about 15% by weight of an overcolor dye that maintains its characteristic color in the presence of a pH of about 10 or greater; and a thickener in an amount of from about 1% to about 5% by weight.

27. A washable coloring composition comprising (a) from about 20% to about 55% of a compatible surfactant;

(b) from about 0.1% to about 10% by weight of a base;

(c) from about 1% to about 20% by weight of a reducing agent; and (d) from about 0.1% to about 15% by weight of a colorant which maintains its characteristic color in the presence of both a pH of about 10 or greater and a reducing agent.

28. A washable multiple coloring composition system comprising:
   (a) a first undercolor aqueous coloring composition comprising from about 20% to about 55% by weight of a compatible surfactant and an undercolor dye whose coloring ability is destroyed in the presence of a pH of about 10 or greater;
   (b) a second undercolor aqueous coloring composition comprising from about 20% to about 55% by weight of a compatible surfactant and an undercolor dye whose coloring ability is destroyed in the presence of a reducing agent; and
   (c) an overcolor aqueous coloring composition comprising from about 20% to about 55% by weight of a compatible surfactant, from about 0.1% to about 15% by weight of a colorant capable of maintaining its characteristic color in the presence of a pH of about 10 or greater, an effective amount of a base sufficient to yield a pH of said overcolor aqueous coloring composition of about 10 or greater, and from about 1% to about 20% by weight of a reducing agent.

29. The multiple coloring composition system of claim 28, said base being present in an amount sufficient to yield a pH of said overcolor aqueous coloring composition of from about 10 to about 12.

30. A washable ink composition system comprising:
   (a) a first undercolor aqueous ink comprising from about 20% to about 55% by weight of a compatible surfactant and an undercolor dye whose coloring ability is destroyed in the presence of a pH of about 10 or greater in an amount of from about 0.1% to about 15% by weight of the undercolor ink;
   (b) a second undercolor aqueous ink comprising from about 20% to about 55% by weight of a compatible surfactant and an undercolor dye whose coloring ability is destroyed in the presence of a reducing agent; and
   (c) an overcolor aqueous ink comprising from about 20% to about 55% by weight of a compatible surfactant, from about 1% to about 20% by weight of said overcolor ink of a reducing agent; from about 0.1% to about 10% by weight of said overcolor ink of a base; and from about 0.1% to about 15% by weight of said overcolor ink of an overcolor colorant which maintains its characteristic color in the presence of a reducing agent and a pH of about 10 or greater.

31. A washable color changing marking system comprising at least a first undercolor marking instrument and a second undercolor marking instrument and at least one overcolor marking instrument, said first undercolor marking instrument containing a first undercolor ink composition comprising from about 20% to about 55% by weight of a compatible surfactant and a dye whose coloring ability is destroyed in the presence of a pH of about 10 or greater, said second undercolor marking instrument containing a second undercolor ink composition comprising from about 20% to about 55% by weight of a compatible surfactant and comprising an undercolor dye whose coloring ability is destroyed in the presence of a reducing agent, and said overcolor marking instrument containing an overcolor ink, said overcolor ink comprising
   (1) from about 20% to about 55% by weight of a compatible surfactant;
   (2) from about 0.1% to about 10% by weight of a base; and
   (3) from about 0.1% to about 15% by weight of a colorant which maintains its characteristic color in the presence of a pH of about 10 or greater, and from about 1% to about 20% by weight of a reducing agent and wherein said pH of said overcolor ink is about 10 or greater.

32. The multiple coloring composition system of claim 1, said surfactant of said undercolor aqueous coloring composition being present in an amount of from about 20% to about 55% by weight.

33. The multiple coloring composition of claim 1, wherein said surfactant is an anionic surfactant selected from the group consisting of diphenyl oxide disulfonate and sodium naphthalene sulfonate.

34. The multiple coloring composition of claim 17, wherein said surfactant is an anionic surfactant selected from the group consisting of diphenyl oxide disulfonate and sodium naphthalene sulfonate.

35. The multiple coloring composition of claim 20, wherein said surfactant is an anionic surfactant selected from the group consisting of diphenyl oxide disulfonate and sodium naphthalene sulfonate.

36. The multiple coloring composition of claim 28, wherein said surfactant is an anionic surfactant selected from the group consisting of diphenyl oxide disulfonate and sodium naphthalene sulfonate.

37. A washable multiple coloring composition system comprising:
   (a) an undercolor aqueous coloring composition comprising a compatible surfactant in an amount sufficient to provide washability to said undercolor aqueous coloring composition and an undercolor dye whose coloring ability is destroyed in the presence of a reducing agent; and
   (b) an overcolor aqueous coloring composition comprising a compatible surfactant in an amount sufficient to provide washability to said overcolor aqueous coloring composition, a colorant capable of maintaining its characteristic color in the presence of a reducing agent, and a reducing agent.

38. The multiple coloring composition system of claim 37, wherein said surfactant in said overcolor aqueous coloring composition is present in an amount from about 20% to about 55% by weight.

39. The multiple coloring composition system of claim 37, wherein said surfactant in said undercolor aqueous coloring composition is present in an amount of from about 20% to about 55% by weight.

40. The multiple coloring composition system of claim 37, wherein said surfactant is an anionic surfactant.

41. The multiple coloring composition system of claim 40, wherein said anionic surfactant is selected from the group consisting of diphenyl oxide disulfonate and sodium naphthalene sulfonate.

42. The multiple coloring composition system of claim 37, wherein said overcolor aqueous coloring composition further comprises a base in an amount sufficient to elevate the pH of said overcolor aqueous coloring composition to about 10 or greater.

43. The multiple coloring composition system of claim 42, wherein said base is present in an amount of from about 0.1% to about 20% by weight of said overcolor aqueous coloring composition.

44. The multiple coloring composition system of claim 37, wherein said reducing agent is selected from the group consisting of hydrogen sulfide, sodium sulfite, sodium hypochlorite and hydrogen peroxide.

45. The multiple coloring composition system of claim 37, wherein said reducing agent is present in an amount of from about 1% to about 20%.

46. The multiple coloring composition system of claim 37, wherein said undercolor dye of said undercolor coloring composition is selected from the group consisting of polymethine dyes, triphenylmethane dyes, cyanine dyes, methine dyes, and azo dyes which are unstable in the presence of a of about 10 or greater.

47. The multiple coloring composition system of claim 46, wherein said undercolor dye of said undercolor coloring composition is selected from the group consisting of Basic Blue 69, Basic Red 14, Basic Red 49, Acid Green 3, Acid Violet 19 and mixtures thereof.

48. The multiple coloring composition system of claim 37, wherein said colorant of said overcolor coloring composition is selected from the group consisting of xanthene dyes, phthalocyanine dyes, and azo dyes.

49. The multiple coloring composition system of claim 48, wherein said colorant of said overcolor coloring composition is selected from the group consisting of Acid Red 52, Acid Red 87, Acid Red 92, Acid Red 388, Food Red 14, Acid Green 26, Solvent Green 7, Direct Blue 199, and mixtures thereof.

50. A washable ink composition system comprising:
(a) an undercolor aqueous ink comprising a compatible surfactant in an amount sufficient to provide washability and an undercolor dye whose coloring ability is destroyed in the presence of a reducing agent in an amount of from about 0.1% to about 15% by weight of the undercolor ink; and (b) an overcolor aqueous ink comprising from about 20% to about 55% by weight of a compatible surfactant; and from about 0.1% to about 15% by weight of said overcolor ink of an overcolor colorant which maintains its characteristic color in the presence of a reducing agent.

51. A washable color changing marking system comprising at least an undercolor marking instrument and an overcolor marking instrument, said undercolor marking instrument containing from about 20% to about 55% of a compatible surfactant and an undercolor ink composition comprising from about 20% to about 55% of a compatible surfactant and from about 0.1% to about 15% by weight of a colorant which maintains its characteristic color in the presence of a reducing agent.

52. A washable paint composition system comprising:
(a) an undercolor aqueous paint comprising from about 20% to about 55% of a compatible surfactant and an undercolor dye whose coloring ability is destroyed in the presence of a reducing agent; and
(b) an overcolor aqueous paint comprising from about 20% to about 55% of a compatible surfactant; from about 0.1% to about 15% by weight of an overcolor dye that maintains its characteristic color in the presence of a reducing agent; and a thickener in an amount of from about 1% to about 5% by weight.

* * * * *

UNITED STATES PATENT AND TRADEMARK OFFICE
CERTIFICATE OF CORRECTION

PATENT NO. : 5,486,228
DATED : January 23, 1996
INVENTOR(S) : Richard E. Miller et al It is certified that error appears in the above-indentified patent and that said Letters Patent is hereby corrected as shown below:

On the title page: Item [56] References Cited:

Under "References Cited"

3,700,603 reads "6/1972" and should read --6/1969--

5,326,388 7/1994 reads "Miller" and should read --Miller et al.--

In the Specification:

Col. 1, line 40, "typical children'scoloring" should read --typical children's coloring--

Col. 14, line 61, "5 and bleach" should read --5 and 6 bleach--

Col. 15, line 40, "respectively, 6 and" should read --respectively, and--

In claim 46, Col. 21, line 6, "of about" should read --pH of about--

Signed and Sealed this

Twenty-first Day of May, 1996

Attest:

BRUCE LEHMAN

*Attesting Officer*        *Commissioner of Patents and Trademarks*